US012559090B2

(12) United States Patent
Wen et al.

(10) Patent No.: US 12,559,090 B2
(45) Date of Patent: Feb. 24, 2026

(54) CONTROL METHOD, VEHICLE, AND STORAGE MEDIUM

(71) Applicant: Beijing Tusen Zhitu Technology Co., Ltd., Beijing (CN)

(72) Inventors: Tingjun Wen, Beijing (CN); Jie Yang, Beijing (CN); Siquan Chen, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 349 days.

(21) Appl. No.: 18/181,399

(22) Filed: Mar. 9, 2023

(65) Prior Publication Data

US 2023/0294669 A1     Sep. 21, 2023

(51) Int. Cl.
*B60W 30/06* (2006.01)
*B60W 50/029* (2012.01)
(Continued)

(52) U.S. Cl.
CPC .......... *B60W 30/06* (2013.01); *B60W 50/029* (2013.01); *B60W 60/00186* (2020.02);
(Continued)

(58) Field of Classification Search
CPC ....... B60W 2420/403; B60W 2520/10; B60W 2552/53; B60W 2556/40; B60W 30/06;
(Continued)

(56) References Cited

U.S. PATENT DOCUMENTS

| | | | | |
|---|---|---|---|---|
| 9,157,835 | B2 * | 10/2015 | Kichise | .............. G01D 5/24461 |
| 10,850,769 | B2 * | 12/2020 | Asaka | ...................... G01D 5/12 |

(Continued)

FOREIGN PATENT DOCUMENTS

| | | | |
|---|---|---|---|
| CN | 111516673 A * | 8/2020 | ........... G06V 20/588 |
| CN | 111516673 A1 | 8/2020 | |

(Continued)

OTHER PUBLICATIONS

United Arab Emirates Ministry of Economy, Substantive Examination Result, Office Action Summary & Search Report for UA Appl. No. P6000541/2023, mailed on Nov. 22, 2024, 12 pages.
European Patent Office, Extended European Search Report for EP Appl. No. 23160609.6, mailed on Jul. 14, 2023, 11 pages.

*Primary Examiner* — Babar Sarwar
(74) *Attorney, Agent, or Firm* — Perkins Coie LLP

(57) ABSTRACT

The present disclosure provides a control method, a vehicle, and a storage medium, wherein the control method comprises: determining lane line information according to image information or map information; determining a parking trajectory according to the lane line information; and controlling the vehicle according to the parking trajectory. In the method, the problem that the vehicle, when the autonomous driving system fails, cannot be safely parked is solved; the image information or the map information is taken as auxiliary information for safe parking, lane line information of a road where the vehicle is located is determined according to the image information or the map information, and assisted parking is performed through the lane line information. The parking trajectory is determined through the lane line information, the vehicle is controlled according to the parking trajectory, and the safe parking of the vehicle is achieved.

17 Claims, 3 Drawing Sheets

(51) Int. Cl.
  *B60W 60/00*      (2020.01)
  *G06T 7/246*      (2017.01)
  *G06V 20/56*      (2022.01)

(52) U.S. Cl.
  CPC ............ *G06T 7/246* (2017.01); *G06V 20/588*
      (2022.01); *B60W 2420/403* (2013.01); *B60W*
      *2520/10* (2013.01); *B60W 2552/53* (2020.02);
      *B60W 2556/40* (2020.02); *G06T 2207/20076*
      (2013.01); *G06T 2207/30241* (2013.01); *G06T*
      *2207/30256* (2013.01); *G06T 2207/30264*
                            (2013.01)

(58) Field of Classification Search
  CPC .......... B60W 50/029; B60W 60/00186; B62D
          15/0285; G05D 1/0246; G05D 1/0274;
          G06F 11/0739; G06F 11/076; G06F
          11/14; G06T 2207/20076; G06T
          2207/30241; G06T 2207/30256; G06T
          2207/30264; G06T 7/246; G06V 10/12;
          G06V 10/44; G06V 10/471; G06V 10/74;
          G06V 10/80; G06V 10/82; G06V 20/586;
          G06V 20/588; G06V 20/70
  See application file for complete search history.

(56)            References Cited

U.S. PATENT DOCUMENTS

2006/0200290 A1*  9/2006  Chino ................... B62D 6/008
                                              180/443
2013/0319100 A1*  12/2013  Kichise ................ G01M 17/06
                                              73/117.02
2015/0046039 A1*  2/2015  Yamano .............. B62D 5/0481
                                              701/41
2015/0314803 A1*  11/2015  Kojo .................... B60T 8/1755
                                              701/43
2018/0348779 A1*  12/2018  Oniwa ............... B60T 8/17557
2019/0061811 A1*  2/2019  Odate ................. B62D 5/0463
2020/0217685 A1   7/2020  Koh
2020/0302662 A1*  9/2020  Homayounfar ...... G06V 10/454
2021/0094577 A1*  4/2021  Shalev-Shwartz ..........................
                                              B60W 40/105

FOREIGN PATENT DOCUMENTS

CN        112477882 A      3/2021
CN        113682323 A      11/2021
EP          4184452 A1      5/2023

* cited by examiner

CONTROL METHOD, VEHICLE, AND STORAGE MEDIUM

The present document claims priority to Chinese Patent Application No. 202210255816.3, titled "CONTROL METHOD, VEHICLE, AND STORAGE MEDIUM", filed on Mar. 15, 2022, the content of which is incorporated herein by reference in its entirety.

TECHNICAL FIELD

The present document relates to the technical field of vehicle control, and in particular to a control method, a vehicle, and a storage medium.

BACKGROUND

The high-level autonomous (unmanned) vehicles, when the autonomous driving system fails, cannot be safely parked, thereby creating a hazard. In the prior art, two separate and identical autonomous driving systems of some autonomous vehicles are mutually redundant, but the cost is relatively high; some autonomous vehicles may directly brake when the autonomous driving system fails, no sensing information is used for assisting in parking, and thus the design cannot guarantee the safety and reliability of parking.

SUMMARY

The present disclosure provides a control method for a vehicle, a vehicle, and a storage medium, so as to solve the problem that the parking cannot be properly performed when the autonomous driving system fails.

According to an aspect of the present disclosure, provided is a control method for a vehicle, which comprises:

determining lane line information according to image information or map information;

determining a parking trajectory according to the lane line information; and controlling the vehicle according to the parking trajectory.

According to another aspect of the present disclosure, provided is a vehicle, which comprises:

an image acquisition apparatus, configured for acquiring image information;

at least one processor; and a memory in communicative connection with the at least one processor; wherein the memory stores a computer program executable by the at least one processor, and the computer program, when executed by the at least one processor, enables the at least one processor to implement the control method for a vehicle according to any of the embodiments of the present disclosure.

According to another aspect of the present disclosure, provided is a computer-readable storage medium having a computer instruction stored thereon, wherein the computer instruction, when executed by a processor, causes the processor to implement the control method for a vehicle according to any of the embodiments of the present disclosure.

According to the technical solution in the embodiments of the present disclosure, the method comprises determining lane line information according to image information or map information; determining a parking trajectory according to the lane line information; and controlling a vehicle according to the parking trajectory. In the method, the problem that the vehicle, when the autonomous driving system fails, cannot be safely parked is solved; the image information or the map information is taken as auxiliary information for safe parking, lane line information of a road where the vehicle is located is determined according to the image information or the map information, and assisted parking is performed through the lane line information. The parking trajectory is determined through the lane line information, the vehicle is controlled according to the parking trajectory, and the safe parking of the vehicle is achieved, so that the safety of the vehicle and the driver is guaranteed. Meanwhile, the complexity of the safe parking system is reduced and the economical efficiency is improved on the premise of ensuring safe parking.

It should be understood that what is described in this section is not intended to identify key or critical features of the embodiments of the present disclosure, and it is also not intended to limit the scope of the present disclosure. Other features of the present disclosure will become apparent from the following description.

BRIEF DESCRIPTION OF THE DRAWINGS

In order to more clearly illustrate the technical solutions in the embodiments of the present disclosure, the drawings required for use in the embodiments will be briefly described below. It is obvious that the drawings in the description below are only some embodiments of the present disclosure, and other drawings can be derived from these drawings by those skilled in the art without making creative efforts.

DETAILED DESCRIPTION

In order to enable those skilled in the art to better understand the technical solutions of the present disclosure, the technical schemes in some embodiments of the present disclosure are described below with reference to the drawings. It is understood that the described embodiments are only part of the embodiments of the present disclosure rather than all of the embodiments. All other embodiments obtained by those skilled in the art without making any creative effort based on the embodiments of the present disclosure shall fall within the protection scope of the present disclosure.

It should be noted that the terms "first", "second", etc. in the specification and claims of the present disclosure and the above drawings are used to distinguish similar objects, and do not have to be used to describe a specific order or sequence. It should be understood that the data used in this manner are interchangeable under appropriate circumstances so that the embodiments of the present disclosure described herein can be implemented in other manners in addition to those illustrated or described herein. Moreover, the terms "comprise" and "have" and any variations thereof are intended to cover non-exclusive inclusion. For example, a process, a method, a system, a product or a device comprising a series of steps or units is not necessarily limited to the explicitly listed steps or units, but may comprise other steps or units that are not explicitly listed or are inherent in the process, the method, the system, the product or the device.

Embodiment I

Figure 1:
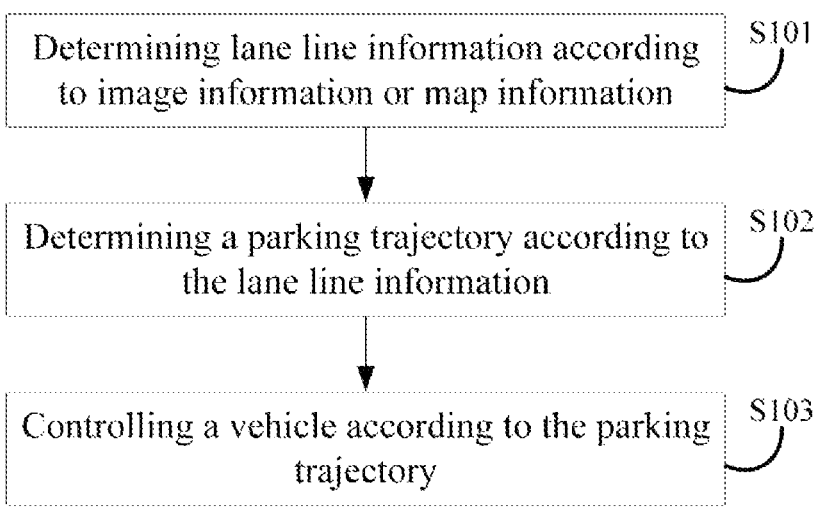
FIG. 1 is a flowchart of a control method according to Embodiment I of the present disclosure.

FIG. 1 is a flowchart of a control method according to Embodiment I of the present disclosure; this embodiment is applicable to a case where a vehicle is subjected to safe parking control, the method may be implemented by a computer device, and the computer device may be mounted on the vehicle. As shown in FIG. 1, the method comprises:

S101, determining lane line information according to image information or map information.

In some embodiments, the image information may be specifically understood as information of an image acquired in the vehicle traveling process. The image information may include information of the environment around the vehicle, information of a road where the vehicle is traveling, and the like. The image information is acquired by an image acquisition apparatus which may be mounted on the vehicle. The image acquisition apparatus may be a camera, a video camera, or the like. The map information is map information of a road where the vehicle is traveling, and is usually provided to the autonomous driving system by a third-party map provider, for example, the autonomous driving system obtains a map from the third-party map provider, and obtains map information near the vehicle according to positioning information returned by the global positioning system (GPS). The lane line information may be specifically understood as relevant information of a lane line on a road where the vehicle is traveling, for example, the lane line information may be a function or a parameter describing the lane line.

Merely by way of example, the method comprises obtaining image information acquired by an image acquisition apparatus; obtaining map information from the autonomous driving system; determining the image information and the map information; determining whether the image information and the map information are reliable information or not; selecting reliable information to assist a vehicle in realizing safe parking; respectively determining the reliability of the image information and the map information; and selecting one of the image information and the map information for determining lane line information, for example, a lane line is screened from the image information, and lane line information that can represent the lane line is determined through data processing.

S102, determining a parking trajectory according to the lane line information.

In some embodiments, the parking trajectory may be specifically understood as a trajectory along which the vehicle is controlled to stop, for example, when a vehicle travels on a road, the vehicle travels in the middle of the lane lines on both sides according to the traffic rules, and when the autonomous driving system of the vehicle fails, the vehicle needs to park according to the parking trajectory, so as to ensure the safety of the vehicle.

Specifically, the lane line information is information of lane lines on both sides of the vehicle, but the lane line information acquired by the image acquisition apparatus may have problems of inaccurate information, missing information (for example, only one-side lane line), and the like, and therefore, after the lane line information is determined, it is determined whether the lane line information is accurate and reliable, and at the same time, it is determined whether the lane line information is information of one-side lane line or information of two-side lane lines, and then a corresponding path is selected as the parking trajectory according to the lane line information.

S103, controlling the vehicle according to the parking trajectory.

After the parking trajectory is determined, a corresponding control instruction may be directly generated according to the parking trajectory to control the vehicle to brake along the parking trajectory, so that the vehicle can be safely parked; the control instruction may be a steering wheel control instruction, a deceleration instruction or the like; or the tracking error of the vehicle relative to the track is determined according to the parking trajectory, then error delay compensation is performed according to the tracking error, and a corresponding control instruction is generated according to the compensated information to control the vehicle to safely park such that the vehicle brakes along the parking trajectory with a relatively small tracking error.

According to the control method in some embodiments of the present disclosure, the method comprises determining lane line information according to image information or map information; determining a parking trajectory according to the lane line information; and controlling the vehicle according to the parking trajectory. In the method, the problem that the vehicle, when the autonomous driving system fails, cannot be safely parked is solved; the image information or the map information is taken as auxiliary information for safe parking, lane line information of a road where the vehicle is located is determined according to the image information or the map information, and assisted parking is performed through the lane line information. The parking trajectory is determined through the lane line information, the vehicle is controlled according to the parking trajectory, and the safe parking of the vehicle is achieved, so that the safety of the vehicle and the driver is guaranteed. Meanwhile, the complexity of the safe parking system is reduced and the economical efficiency is improved.

Embodiment II

Figure 2:
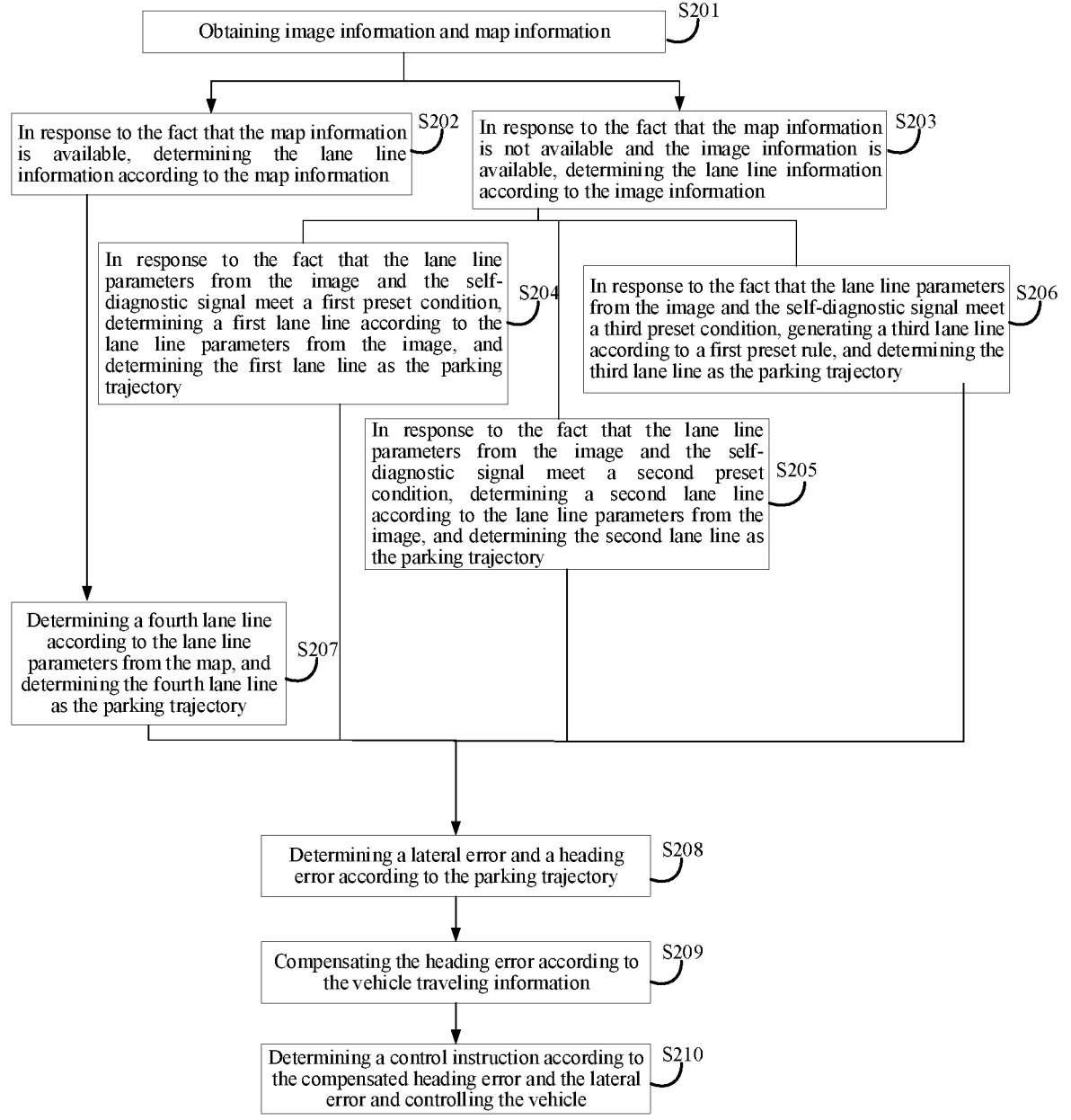
FIG. 2 is a flowchart of a control method according to Embodiment II of the present disclosure.

FIG. 2 is a flowchart of a control method according to Embodiment II of the present disclosure, and this embodiment is detailed based on the above embodiment. As shown in FIG. 2, the method comprises:

S201, obtaining image information and map information.

When an autonomous driving system (or a host computer) of the vehicle fails and the vehicle cannot be controlled autonomously to complete emergency parking, map information and image information are obtained and the vehicle parking control is performed according to the image information or the map information.

S202, in response to the fact that the map information is available, determining the lane line information according to the map information.

Whether the map information is available or not is determined; the autonomous driving system of the vehicle generally has monitoring nodes for monitoring the status of a map module, and is responsible for forwarding the status of the map module, and the status of the map information is represented by the status of the map module. When the map information has the problems of low accuracy, missing and the like, which cannot be taken as reliable information for controlling the safe parking of the vehicle, the monitoring nodes may directly report an error to indicate that the map information is not available and send the map information to an intelligent device for implementing the control method.

Merely by way of example, when any of the following steps of the map information forwarding node of the autonomous driving system fails, the monitoring nodes report an error: 1. reading the map (reading failure); 2. reading vehicle position (reading failure); 3. determining the current lane line from the map (the positioning exceeds the map range, and the lane line cannot be found); 4. fitting lane lines (too few lane line boundary points); and 5. sending the lane lines (sending failure).

Or, the intelligent device implementing the control method may also determine whether the map information is available by monitoring the transmission and reception states of the messages related to the high-accuracy map information. When the map information is available, the map information at the moment is reliable information and may be used for assisting the vehicle in completing safe parking, and therefore, lane line information may be determined according to the map information. The mode of determining the lane line information according to the map information may be as follows: determining the position of the vehicle in a map according to the positioning of the vehicle, with lane lines and lane line information of all roads stored in the map in advance, and determining the lane line information according to the position of the vehicle. Or, in order to reduce the communication load, after the lane lines are determined according to the position of the vehicle, the lane line information is determined by performing data fitting on the lane lines, for example, by fitting into a cubic curve, and taking the curve parameters as lane line information.

When the map information is available, the reliability of the image information is verified through the map information, whether the image information is available and stored is determined, and the availability of the image information is updated (substantially) in real time because the map information and the image information are updated (substantially) in real time.

S203, in response to the fact that the map information is not available and the image information is available, determining the lane line information according to the image information.

When the map information is not available, the map information at the moment cannot be used for assisting the vehicle in safe parking, and the image information is used for assisting the vehicle in safe parking. When the map information is not available, a verification result of whether the image information was available last time is obtained, and whether the image information is available or not is determined. When the image information is available, lane lines are screened out from the image information, data fitting is performed on the lane lines, and then the lane line information is determined. The method for screening out the lane lines from the image information may be that pixel points forming the lane lines are screened out through an algorithm, a neural network model and the like, and data fitting is performed according to coordinates of the pixel points to obtain the lane line information.

It needs to be noted that S202 and S203 are parallel steps, and one of them is selected to be executed in a practical application.

In some embodiments, the process illustrated in FIG. 2, or a portion thereof, may be optimized or revised as follows: the vehicle comprises an image acquisition apparatus for acquiring image information, and the method further comprises: determining whether the image information is available or not;

wherein the determining whether the image information is available or not specifically comprises: in response to the fact that a state of the image acquisition apparatus is normal, determining that the image information is available.

In some embodiments, the image acquisition apparatus may be mounted in the front left, front right, middle, or the like of the vehicle, or the image acquisition apparatus may be a vehicle recorder or the like of the vehicle. When the image acquisition apparatus is mounted, effective acquisition of lane lines and the accuracy of image information needs to be ensured. The image acquisition apparatus may be independently powered, so that the image acquisition apparatus may still normally work when partial parts or devices in the vehicle fail, and reliable information reference is provided for safe parking.

Merely by way of example, an image acquisition apparatus is arranged on the vehicle to acquire image information and assist the vehicle in safe parking. The state of the image acquisition apparatus is determined and may be divided into normal state and abnormal state. The image information acquired by the image acquisition apparatus in normal state is available, and the image information acquired by the image acquisition apparatus in abnormal state is not available. The state of the image acquisition apparatus may be determined and updated according to the map information and the image information. The state of the image acquisition apparatus at the latest moment is acquired, and if the state of the image acquisition apparatus is normal, it is determined that the image information is available.

In some embodiments, the process illustrated in FIG. 2, or a portion thereof, may be optimized or revised as follows: the vehicle comprises an image acquisition apparatus, and the method further comprises: in response to the fact that the map information is available, updating a state of the image acquisition apparatus based on the map information and the image information.

Merely by way of example, the state of the image acquisition apparatus may be determined according to the map information and the image information. When the map information is available, if the image information is determined to be unreliable according to the map information, it is determined that the state of the image acquisition apparatus is abnormal, and the state of the image acquisition apparatus is updated to be abnormal; if the image information is determined to be reliable according to the map information, it is determined that the state of the image acquisition apparatus is normal, and the state of the image acquisition apparatus is updated to be normal. The mode of determining whether the image information is reliable or not according to the map information may be that the difference between the lane line information in the map information and the lane line information in the image information is relatively large and is not within an error allowable range.

By updating the state of the image acquisition apparatus (substantially) real time, the case where the image information of the image acquisition apparatus is still adopted for vehicle parking when the image acquisition apparatus fails due to an angle deviation, function damage, or the like, may be avoided.

Figure 3:
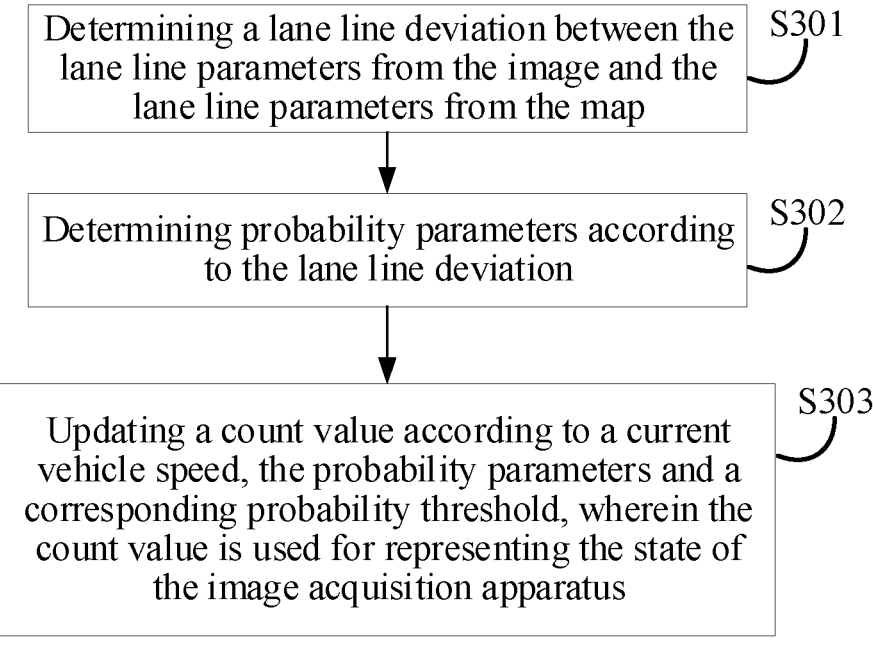
FIG. 3 is a flowchart for implementing state update of an image acquisition apparatus according to Embodiment II of the present disclosure.

Optionally, FIG. 3 is a flowchart for implementing state update of an image acquisition apparatus according to some embodiments of the present disclosure, where the image information comprises lane line parameters from an image, and the map information comprises lane line parameters from a map; the updating a state of the image acquisition apparatus based on the map information and the image information comprises the following steps:

S301, determining a lane line deviation of the lane line parameters from the image according to the lane line parameters from the map.

In some embodiments, the lane line parameters from the image may be specifically understood as parameters of lane lines in the image, and the lane line parameters may determine a unique lane line; the lane line parameters from the map may be specifically understood as parameters of lane lines in the map. Here, the lane line deviation may be specifically understood as a deviation of the lane lines in the image acquired by the image acquisition apparatus relative to the lane lines in the map.

For example, the lane lines in the present disclosure may be represented by cubic curve parameters, and the relationship between the lane lines and the lane line parameters is as follows: $y=c_0+c_1*x+c_2*x^2+c_3*x^3$, where y is a lane line, and $c_0$, $c_1$, $c_2$ and $c_3$ are lane line parameters. For the convenience of calculation, the same position is taken as an origin when the lane line parameters from the image and the lane line parameters from the map are determined.

Specifically, when the map information is available, the lane line parameters from the map in the map information are taken as the comparison standard of the lane line parameters, whether the lane line parameters from the image are accurate or not is determined, and whether the image acquisition apparatus is reliable or not is further determined, namely whether the state of the image acquisition apparatus is normal or not is determined. The lane line parameters from the map are determined by processing the lane lines in the map information, or the lane line parameters from the map are determined by processing the map information in advance, and the lane line parameters from the map are directly obtained from the map information. The lane line parameters from the image are determined by processing the lane lines in the image information, or the lane line parameters from the image are obtained by identifying and processing the lane lines in the image information after the image acquisition apparatus acquires the image information, and the lane line parameters from the image in the image information are directly obtained. The deviation between two lane lines is calculated based on the lane line parameters from the image and the lane line parameters from the map, for example, the average deviation between the lane lines in the image and the lane lines in the map within a preset distance is calculated.

S302, determining probability parameters according to the lane line deviation.

In some embodiments, the probability parameters may be specifically understood as parameters for evaluating the magnitude of deviation between the lane lines in the map and the lane lines in the image. If the lane lines in the map and the lane lines in the image accord with one parameter distribution type, a probability calculation formula is determined according to the parameter distribution type, and the probability parameters are obtained through calculation using the lane line deviation and the probability calculation formula.

For example, some embodiments of the present disclosure provides a probability parameter calculation method, where data of lane lines in the image and lane lines in the map are compared based on 3-Sigma criteria. If the lane lines in the map are taken as a reference, the deviation between the lane lines from the image acquisition apparatus and the lane lines in the map at the moment accords with normal distribution with the mean value being 0 and the standard deviation being sigma. The average deviation e between the lane lines in the image and the lane lines in the map within the preset distance is calculated, e is taken as the lane line deviation, and then the probability parameter P with numerical distribution in $(-\infty,-e)$ U $(e,\infty)$ is calculated. The probability parameter P may be taken as an evaluation index for lane lines in the image, where the larger the probability P is, the smaller the deviation e is. The preset distance may be any value, or may be determined according to a safe distance in the vehicle traveling process, for example, the safe distance is 30-40 meters, and the preset distance is 50 m. The preset distance may also take into account the effective identification range of the image acquisition apparatus.

S303, updating a count value according to a current vehicle speed, the probability parameters, and a corresponding probability threshold, wherein the count value is used for representing the state of the image acquisition apparatus.

In some embodiments, the current vehicle speed may be specifically understood as a traveling speed of the vehicle at the current data processing moment. The probability threshold may be specifically understood as a boundary value of the probability, and is used for determining whether the probability parameters meet the requirement.

Specifically, the current vehicle speed may be obtained from the autonomous driving system, or may be obtained from a sensor or other devices. The probability thresholds corresponding to the probability parameters are determined, and the coincidence degree of the lane lines in the image and the lane lines in the map is determined by comparing the probability parameters with the probability thresholds. Since the larger the probability parameter is, the smaller the deviation is, it can be determined that the lane lines in the image are coincident with the lane lines in the map when the probability parameter is set to be greater than or equal to the corresponding probability threshold, otherwise, it is determined that the lane lines in the image are not coincident with the lane lines in the map. When the current vehicle speed meets a certain condition, if the lane lines in the image are coincident with the lane lines in the map, the count value is updated, for example, the numerical value of the count value is reduced; if the lane lines in the image are not coincident with the lane lines in the map, the count value may be updated by increasing the numerical value of the count value.

There is a scene where an algorithm in the image acquisition apparatus temporarily fails; for example, when a vehicle is in a curve and changes lanes, the lane line detection is unstable, and when the current lane has no lane line or the lane line is not clear, the lane line identification of the camera is also difficult. At the moment, the determination of the camera failure is inappropriate only because the lane lines in the image which are temporarily erroneously identified are not coincident with the lane lines in the map. Therefore, when the state of the image acquisition apparatus is detected (substantially) in real time, the times that the lane lines in the image acquired by the image acquisition apparatus are not coincident with the lane lines in the map in a past period of time may be represented by a counting value, and when the count value reaches a certain threshold, the state of the image acquisition apparatus may be determined to be abnormal, and the provided lane line parameters from the image are not available.

In some embodiments, the process illustrated in FIG. 3, or a portion thereof, may be optimized or revised is as follows: the probability parameters comprise a first probability parameter, a second probability parameter and a third probability parameter, wherein the first probability parameter is a probability parameter of a left lane line, the second probability parameter is a probability parameter of a right lane line, and the third probability parameter is a probability parameter of a middle lane line; the image information further comprises a self-diagnostic signal comprising state information of the lane line parameters from the image.

In some embodiments, the first probability parameter, the second probability parameter and the third probability parameter are all the same probability parameter, and are used for representing probability parameters of different lane lines. The left lane line and the right lane line are lane lines on the left side and the right side of the vehicle in the vehicle traveling process, wherein the left lane line and the right lane line may be distinguished according to the head direction or the traveling direction of the vehicle. The self-diagnostic signal may be specifically understood as a signal for determining the validity of an image acquired by the image acquisition apparatus, and may comprise effective identification range, quality, data validity, and the like of two-side lane lines. The self-diagnostic signal provided in some embodiments of the present disclosure comprises the state information of the lane line parameters from the image, and is used for representing the state of the lane line parameters from the image, and normal lane line parameter from the image may be used for indicating the normal state of the image acquisition apparatus and is used for safe parking.

In some embodiments, the count value is further updated according to the current vehicle speed, the probability parameters, and the corresponding probability threshold through A1-A2:

A1, in response to the fact that the current vehicle speed exceeds a speed threshold and the third probability parameter is less than a first probability threshold, progressively increasing the count value by a preset step length.

In some embodiments, the speed threshold may be specifically understood as a boundary value used for measuring the speed, and the speed threshold may be preset according to an actual requirement. The value of the first probability threshold may be set according to requirements. The preset step length may be understood as a preset numerical value, for example, 1, 2, etc.

The current vehicle speed is compared with the speed threshold, and if the current vehicle speed exceeds the speed threshold, the third probability parameter is further compared with the first probability threshold corresponding to the third probability parameter. If the current vehicle speed exceeds the speed threshold and the third probability parameter is lower than the first probability threshold, the lane lines in the image are not coincident with the lane lines in the map at the moment, and the count value is increased by a preset step length, for example, the count value may be increased by one.

A2, in response to the fact that the current vehicle speed exceeds a speed threshold and the third probability parameter is not lower than a first probability threshold, updating the count value according to the lane line parameters from the image, the self-diagnostic signal, the first probability parameter, and the second probability parameter.

The current vehicle speed is compared with the speed threshold. When the current vehicle speed exceeds the speed threshold, the third probability parameter is compared with the first probability threshold corresponding to the third probability parameter. If the current vehicle speed exceeds the speed threshold and the third probability parameter is greater than or equal to the first probability threshold, the lane lines in the image are coincident with the lane lines in the map at the moment, the count value is updated by decreasing its value. Since the coincidence of the lane lines in the image and the lane lines in the map includes different conditions such as coincidence of a middle lane line, coincidence of a left lane line, and coincidence of a right lane line, the count value is further updated according to the lane line parameters from the image, the self-diagnostic signal, the first probability parameter, and the second probability parameter. For example, when the left lane lines or the right lane lines are coincident, the count value is decreased; and when the middle lane lines are coincident and the data of the left lane lines and the right lane lines are normal, the count value is decreased.

In some embodiments, the count value is further updated according to the lane line parameters from the image, the self-diagnostic signal, the first probability parameter, and the second probability parameter through B1-B3:

B1, in response to the fact that the lane line parameters from the image and the self-diagnostic signal meet a first preset condition, progressively decreasing the count value by a preset step length.

In some embodiments, the first preset condition may be specifically understood as a condition set in advance, for example, a valid range of data. Whether the lane line parameters from the image and the self-diagnostic signal meet a first preset condition or not is determined, for example, in response to the lane line parameters from the image, such as the lane line parameter of the left line of a lane and the lane line parameter of the right line of the same lane, are within an effective set range and the self-diagnostic signal is within an effective set range, the first preset condition is determined to be met; when the first preset condition is determined to be met, the count value is decreased by a preset step length.

B2, in response to the fact that the lane line parameters from the image and the self-diagnostic signal meet a first preset condition and the first probability parameter is not less than a second probability threshold, progressively decreasing the count value by a preset step length.

When the lane line parameters from the image and the self-diagnostic signal meet the first preset condition, the first probability parameter and the second probability threshold are further compared, and when the first probability parameter is not less than the second probability threshold, at the moment, the left lane line in the image is coincident with the left lane line in the map, and the count value is decreased by a preset step length.

B3, in response to the fact that the lane line parameters from the image and the self-diagnostic signal meet a first preset condition and the second probability parameter is not less than a third probability threshold, progressively decreasing the count value by a preset step length.

When the lane line parameters from the image and the self-diagnostic signals meet the first preset condition, the second probability parameter and the third probability threshold are compared, and when the second probability parameter is not less than the third probability threshold, at the moment, the right lane line in the image is coincident with the right lane line in the map, and the count value is decreased by a preset step length.

In some embodiments, the second probability threshold and the third probability threshold may be preset, and the first probability threshold, the second probability threshold and the third probability threshold have the same function and are all used for measuring whether the probability parameters meet the condition.

Decreasing the count value may be realized through steps B1-B3, and when the conditions of different steps are met, the count value is respectively decreased, and the conditions of the above two or three steps may be met at the same time. For example, if the lane line parameters from the image and the self-diagnostic signal met a first preset condition, the first probability parameter is not less than the second probability threshold and the second probability parameter is not less than the third probability threshold, and the preset step length is 1; the lane line parameters from the image and the self-diagnostic signal met the first preset condition (step B1 is performed), and the count value is decreased by 1; then it is determined that the first probability parameter is not less than the second probability threshold (step B2 is performed), and the count value is again decreased by 1; it is further determined that the second probability parameter is not less than the third probability threshold (step B3 is performed), and the count value continues to be decreased by 1 with a total decrease by 3.

The first probability parameter, the second probability parameter, and the third probability parameter in some embodiments of the present disclosure may be identical or different in value, and may be specifically set according to actual requirements.

In other cases, the count value remains unchanged, and for example, the count value is not increased or decreased when the current vehicle speed is below or equal to the speed threshold.

In some embodiments, the count threshold may be specifically understood as a boundary value of the count value, and is used for determining whether the count value meets a condition. When the updated count value is not greater than the count threshold, the state of the image acquisition apparatus is determined to be normal; when the updated count value is greater than or equal to the count threshold, the state of the image acquisition apparatus is determined to be abnormal.

After the lane line information is determined, a parking trajectory is determined according to the lane line information. When the lane line information is determined according to the image information, the lane line information comprises the lane line parameters from the image and the self-diagnostic signal, the self-diagnostic signal comprising the state information of the lane line parameters from the image, at the moment, S204-S206 are performed to determine the parking trajectory, and when the lane line information is derived from the image information, the parking trajectory is further selected. When the lane line information is determined according to the map information, the lane line information comprises the lane line parameters from the map, and at the moment, S207 is performed to determine the parking trajectory. It needs to be noted that S204-S206 and S207 are parallel solutions.

S204, in response to the fact that the lane line parameters from the image and the self-diagnostic signal meet a first preset condition, determining a first lane line according to the lane line parameters from the image, and determining the first lane line as the parking trajectory.

In some embodiments, the first lane line may be specifically understood as a lane line selected according to the lane line parameters from the image. The first preset condition may be that the left lane line parameter and the right lane line parameter of the lane line parameters from the image and the self-diagnostic signal are all within an effective set range. When the lane line parameters from the image and the self-diagnostic signal meet a first preset condition, a left lane line and a right lane line of the vehicle may be determined according to the lane line parameters from the image, any one of the lane lines in the middle of the left lane line and the right lane line is selected as a first lane line according to the left lane line and the right lane line, for example, a middle lane line is determined according to the left lane line and the right lane line, the middle lane line is taken as a first lane line, and the first lane line is determined as a parking trajectory.

S205, in response to the fact that the lane line parameters from the image and the self-diagnostic signal meet a second preset condition, determining a second lane line according to the lane line parameters from the image, and determining the second lane line as the parking trajectory.

In some embodiments, the second preset condition may be that the self-diagnostic signal is within the effective range, and only the parameters of one of the left lane line and the right lane line from the image are normal, that is, only the parameters of one of the lane line are within the effective range. When the lane line parameters from the image and the self-diagnostic signal meet a second preset condition, a normal lane line parameter and an abnormal lane line parameter in the lane line parameters from the image are determined, and the normal lane line parameter is selected as the parameter of a second lane line; or an abnormal lane line parameter may also be corrected based on a normal lane line parameter, the corrected lane line parameters of both lane lines are considered to be normal, and the second lane line is determined according to the lane line parameters of both the left lane line and the right lane line, in which the mode may refer to S204.

Merely by way of example, the abnormal lane line parameter may be corrected by: determining the direction (left or right) of the abnormal lane line parameter, generating a lane line according to a certain rule in the corresponding direction (right or left) of the normal lane line, and taking the parameter of the generated lane line as the corrected lane line parameter. For example, since the width of the lane is known in advance, and the two-side lane lines are generally parallel to each other, the corrected lane lines may be obtained by shifting the normal lane lines into the direction of the abnormal lane lines by a certain width.

S206, in response to the fact that the lane line parameters from the image and the self-diagnostic signal meet a third preset condition, generating a third lane line according to a first preset rule, and determining the third lane line as the parking trajectory.

In some embodiments, the third preset condition may be that the self-diagnostic signal is within the effective range, and neither of the left lane line parameters and the right lane line parameters in the lane line parameters from the image is within the effective range. The first preset rule may be specifically understood as a preset lane line generation rule.

When the lane line parameters from the image and the self-diagnostic signal meet a third preset condition, a preset first preset rule is determined, a third lane line is generated according to the first preset rule, and the third lane line is taken as a parking trajectory. The first preset rule may be a selection rule of the cubic curve parameters $c_0$, $c_1$, $c_2$ and $c_3$ of the lane lines, for example, $c_0$, $c_1$, $c_2$ and $c_3$ are all 0, that is, the third lane line is a straight line which starts from the center point of the vehicle head and always points to the right front of the vehicle.

S207, determining a fourth lane line according to the lane line parameters from the map, and determining the fourth lane line as the parking trajectory.

The lane line parameters from the map may also include lane line parameters of the left and right sides, and one lane line is selected as the fourth lane line according to the lane line parameters from the map, for example, any one of the lane lines in the middle of the two-side lane lines is selected as the fourth lane line, and in some embodiments, the middle lane line of the lane lines in the map is selected as the fourth lane line, and the fourth lane line is taken as the parking trajectory.

In some embodiments, the process, or a portion thereof, may be optimized or revised as follows: in response to the fact that the map information is not available and the image information is not available, a fifth lane line is generated according to a second preset rule, and the fifth lane line is determined as a parking trajectory.

In some embodiments, the second preset rule may be the same as or different from the first preset rule. When the map information is not available and the image information is not available, the lane line information cannot be directly determined according to the map information and the image information, a second preset rule is obtained, a fifth lane line is generated according to the second preset rule, and the fifth lane line is determined as a parking trajectory.

S208, determining a lateral error and a heading error according to the parking trajectory.

In some embodiments, the lateral error may be specifically understood as an error in the horizontal direction of the vehicle; the heading error may be specifically understood as an error of a variation in the heading angle of the vehicle.

After the parking trajectory is determined, the parameters of the parking trajectory are determined correspondingly, and the expression of the parking trajectory is the same as the expression of the lane line, so that the parameters of the parking trajectory are the same as the parameters of the lane line, including $c_0$, $c_1$, $c_2$ and $c_3$. The opposite value of the zero-order term parameter $c_0$ is determined as the lateral error and the arc-tangent function ($\arctan(-c_1)$) of the opposite value of the linear term parameter $c_1$ is determined as the heading error.

In some embodiments of the present disclosure, the meanings of $c_0$ and $c_1$ are deduced: if the image acquisition apparatus is positioned at x=0, y=0, the y axis points to the left side of the vehicle, and the x axis points to the front of the vehicle. The heading error is an included angle between the direction of the lane line at x=0 and the direction of the vehicle (i.e., the positive direction of the x-axis), and is equal to the arc-tangent function of the derivative of the curve at this position, i.e., the heading error $\arctan(0-y'(x=0))=\arctan(-c_1)$. It is considered that the heading error is usually very small, the lateral error is considered as the distance (intercept) from the intersection of the curve and the x=0 straight line to the image acquisition apparatus, which is equal to $0-y(x=0)=-c_0$.

S209, compensating the heading error according to the vehicle traveling information.

In some embodiments, vehicle traveling information may be specifically understood as related information in the vehicle traveling process, such as yaw rate, steering wheel angle, and lane line curvature data, wherein the yaw rate may be acquired by a yaw rate sensor, and the steering wheel angle may be acquired by a steering wheel angle sensor. The lane line curvature may be determined by an image acquisition apparatus or a map. When the sensor fails, the compensation may be omitted, namely the compensated heading error is equal to the original heading error.

If the delay duration is t_d, the delay compensation module calculates the vehicle heading angle variation delta_yaw and the lane orientation variation delta_lane_heading of the vehicle in the past duration t_d by using data of other sensors, and then the variations are added to the heading error e_heading_camera calculated according to the lane line parameter $c_1$:

$$e\_heading\_corrected=e\_heading\_camera+delta\_yaw-delta\_lane\_heading;$$

delta_yaw is calculated as follows:

The vehicle heading angle variation is obtained by integrating the yaw rate. In some embodiments of the present disclosure, the yaw rate may be directly measured by the vehicle sensor. However, because the accuracy of the sensor is limited, a relatively obvious error, namely "zero offset", occurs after the measured yaw rate yaw_rate_sensor is integrated. Therefore, in some embodiments of the present disclosure, the yaw rate yaw_rate_model may be calculated using the steering wheel angle and basic parameters of the vehicle (based on a two-wheel linear vehicle model):

$$yaw\_rate\_model = \frac{velocity}{L*(1+K*velocity^2)} * \frac{\delta}{steering\_ratio};$$

wherein velocity is a vehicle speed, L is a vehicle wheelbase, $\delta$ is a steering wheel angle, steering_ratio is a steering ratio, and K is a control stability coefficient; the calculation is as follows:

$$K = \frac{m}{L^2} * \left( \frac{Lf}{C\_alpha\_r} - \frac{Lr}{C\_alpha\_f} \right);$$

wherein m is a vehicle mass, Lf is a vehicle mass center-to-front axle distance, Lr is a vehicle mass center-to-rear axle distance, C_alpha_f is a front wheel cornering stiffness, and C_alpha_r is a rear wheel cornering stiffness.

The rotation of the vehicle steering wheel causes the vehicle to rotate, generating a yaw rate, and the sensor then measures to obtain the measured value. Therefore, the actual yaw rate of the vehicle is delayed from the measurement signal of the steering wheel angle sensor by t_steering, and the yaw rate measured by the sensor is delayed from the actual yaw rate by t_sensor. t_sensor is typically less than t_d. If the current moment is t_0, the heading error calculated through the camera corresponds to the moment (t_0-t_d). The variation of the vehicle heading angle within the time t_d is calculated by the following method:

1) selecting all yaw rate measurement values yaw_rate_sensor from the moment (t_0-t_d+t_sensor) to the moment t_0 for accumulation, and multiplying the accumulated measurement values by a measurement signal sampling period to obtain a heading compensation quantity delta_yaw_sensor.
2) selecting all vehicle steering wheel angle measurement signals from the moment (t_0-t_steering-t_sensor) to the moment (t_0-t_steering), calculating and accumulating corresponding yaw rates yaw_rate_model, and finally multiplying the accumulated yaw rates by a measurement signal sampling period to obtain a heading compensation quantity delta_yaw_steering.
3) superposing the two compensation quantities to obtain the variation delta_yaw of the vehicle heading angle:

$$delta\_yaw=delta\_yaw\_sensor+delta\_yaw\_steering$$

delta_lane_heading is calculated as follows:
The variation of the lane orientation is calculated by the lane curvature identified by the image acquisition apparatus and the vehicle speed within the history duration t_d. Because the curvature of the road varies slowly, a second-order term parameter $c_2$ and a linear term parameter $c_1$ in the lane line parameters at the current moment are selected to calculate the lane curvature:

According to the formula $y=c_0+c_1*x+c_2*x^2+c_3*x^3$, when $x=0$, $y'=c_1$, and $y*=2c_2$.

$$curvature = \frac{2c_2}{\left(1+c_1^2\right)^{1.5}};$$

All the vehicle speed measurement signals from the moment (t_0–t_d) to the moment t_0 are selected for accumulation, and the accumulated measurement signals are multiplied by the lane curvature and the measurement signal sampling period to obtain the lane orientation variation delta_lane_heading.

S210, determining a control instruction according to the compensated heading error and the lateral error and controlling the vehicle according to the control instruction.

The control instructions in some embodiments of the present disclosure may include a steering wheel angle instruction and a deceleration instruction, which are sent to a lateral control system (which may be controlled laterally by a steering wheel or steered by applying different braking forces to left and right wheels) and a longitudinal control system (such as a pneumatic braking system, or a mechanical braking system), respectively. The deceleration instruction may be a deceleration of a predetermined magnitude and direction, e.g., $-3$ m/s$^2$, selected to ensure safe parking under varying road surface adhesion conditions. The original steering wheel angle instruction is calculated according to the compensated heading error and the lateral error by combining a given formula. The maximum safe steering wheel angle is further calculated according to the current vehicle speed, and amplitude limiting is performed on the original steering wheel angle instruction based on the maximum safe steering wheel angle to obtain the steering wheel angle after amplitude limiting. If the difference between the steering wheel angle after amplitude limiting and the current steering wheel angle is greater than the safety difference value defined under the current vehicle speed, amplitude limiting may be performed again to obtain the final steering wheel angle instruction. The vehicle lateral control system operates a motor connected to the steering column in accordance with the steering wheel angle instruction to control the steering wheel angle. The longitudinal control system operates the service brake or the parking brake to decelerate the vehicle to stop at a place according to the deceleration instruction.

Some embodiments of the present disclosure provides a control method, in which the determination process of lane line information is refined, and the lane line information is determined by determining whether the map information and the image information are available or not. Whether the image information is available or not may be determined according to the state of the image acquisition apparatus, and the case where the image information acquired by the image acquisition apparatus is still adopted for safe parking during the failings in angle deviation or function damage or the like of the image acquisition apparatus is avoided, thereby improving the data reliability. In some embodiments of the present disclosure, the state updating of the image acquisition apparatus is further refined, and the state of the image acquisition apparatus is represented by the count value. The lane line deviation is determined according to the map information and the image information, the probability parameters are determined according to the lane line deviation, and the count value is further updated according to the current vehicle speed, the probability parameters and the corresponding probability threshold. The state of the image acquisition apparatus is represented by setting the count value, so that the condition that the state of the image acquisition apparatus is unreasonably updated due to unstable lane line detection can be avoided. Meanwhile, the lateral error and the heading error are determined according to the parking trajectory, the heading error is compensated, the error is reduced, the vehicle is accurately controlled, and the safe parking of the vehicle is guaranteed.

Embodiment III

Figure 4:
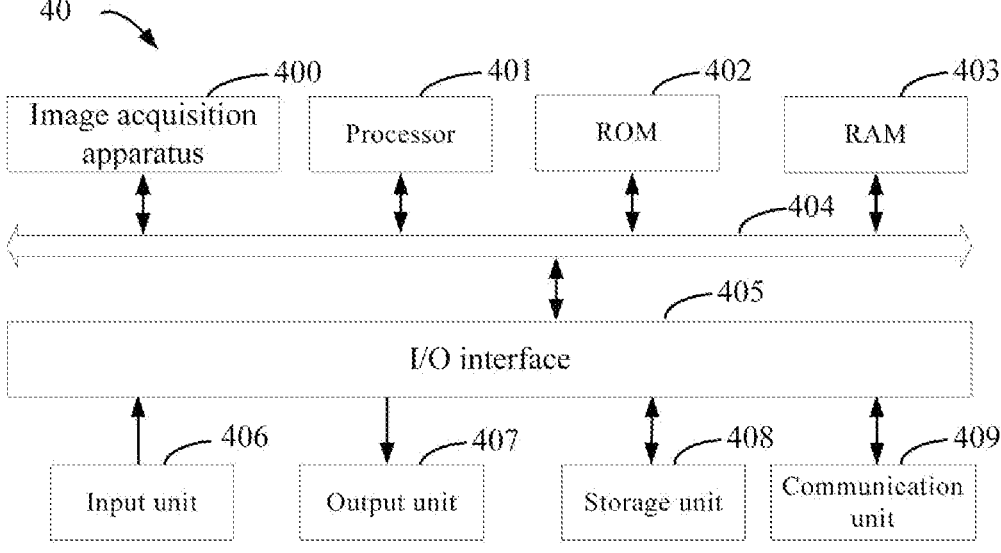
FIG. 4 is a schematic diagram of a vehicle implementing the control method according to some embodiments of the present disclosure.

FIG. 4 illustrates a schematic diagram of a device 40 that may be used to implement some embodiments of the present disclosure. The device 40 may represent various forms of digital computers, such as laptops, desktops, workstations, personal digital assistants, servers, blade servers, mainframes, and other appropriate computers. The device may also represent various forms of mobile apparatuses, such as personal digital assistants, cellular phones, smart phones, wearable devices (e.g., helmets, glasses, and watches), and other similar computing apparatuses. The components shown herein, their connections and relationships, and their functions, are meant to be exemplary only, and are not meant to limit implementations of the present technology described and/or claimed herein. The device 40 may be a vehicle.

As shown in FIG. 4, the vehicle 40 comprises an image acquisition apparatus 400, at least one processor 401, and a memory in communicative connection with the at least one processor 401, such as a read-only memory (ROM) 402 and a random access memory (RAM) 403, wherein the image acquisition apparatus 400 is configured for acquiring image information, and the number of the image acquisition apparatuses 400 may be one or more. The memory stores a computer program executable by the at least one processor, and the at least one processor 401 may perform various appropriate actions and processes according to the computer program stored in the read-only memory (ROM) 402 or loaded from a storage unit 408 into the random access memory (RAM) 403. In the RAM 403, various programs and data required for the operation of the vehicle 40 may also be stored. The at least one processor 401, the ROM 402 and the RAM 403 are connected to each other via a bus 404. An input/output (I/O) interface 405 is also connected to the bus 404.

A plurality of components in the vehicle 40 are connected to the I/O interface 405, including: an input unit 406, such as a keyboard or a mouse; an output unit 407, such as various types of displays and speakers; a storage unit 408, such as a magnetic disk or an optical disk; and a communication unit 409, such as a network card, a modem or a wireless communication transceiver. The communication unit 409 allows the vehicle 40 to exchange information/data with other devices via a computer network, such as the Internet, and/or various telecommunications networks.

The at least one processor 401 may be a variety of general-purpose and/or special-purpose processing components with processing and computing capabilities. Some examples of the at least one processor 401 include, but are not limited to, a central processing unit (CPU), a graphics processing unit (GPU), various dedicated artificial intelligence (AI) computing chips, various processors running machine learning model algorithms, a digital signal processor (DSP), and any suitable processor, controller, microcontroller, and the like. The at least one processor 401 implements the various methods and processes described above, such as the control method.

In some embodiments, the control method may be implemented as a computer program tangibly embodied in a computer-readable storage medium, such as the storage unit 408. In some embodiments, part or all of the computer program may be loaded and/or mounted on the vehicle 40 via the ROM 402 and/or the communication unit 409. When the computer program is loaded into the RAM 403 and executed by the at least one processor 401, one or more steps of the control method described above may be performed. Alternatively, in other embodiments, the at least one processor 401 may be configured to implement the control method in any other suitable manner (e.g., by way of firmware).

Various implementations of the systems and techniques described above may be implemented in digital electronic circuitry, integrated circuitry, field programmable gate arrays (FPGAs), application specific integrated circuits (ASICs), application specific standard products (ASSPs), system-on-chip (SOC), complex programmable logic devices (CPLDs), computer hardware, firmware, software, and/or combinations thereof. These various implementations may include: implementation in one or more computer programs that are executable and/or interpretable on a programmable system including at least one programmable processor which may be special-purpose or general-purpose, reception of data and instructions from, and transmission of data and instructions to, a storage system, at least one input apparatus, and at least one output apparatus.

Computer programs for implementing the method of the present disclosure may be written in any combination of one or more programming languages. These computer programs may be provided to a processor of a general-purpose computer, a special-purpose computer, or other programmable data processing apparatus, such that the computer programs, when executed by the processor, cause the processor to implement the functions/operations specified in the flowchart and/or block diagram. The computer programs are executable entirely on a machine, or partly on a machine, as a separate software packet, partly on the machine and partly on a remote machine or entirely on the remote machine or server.

In the context of the present disclosure, the computer-readable storage medium may be a tangible medium that can contain or store a computer program for use by or in connection use with an instruction execution system, apparatus, or device. The computer-readable storage medium may include, but is not limited to, an electronic, magnetic, optical, electromagnetic, infrared, or semiconductor system, apparatus, or device, or any suitable combination of the above. Alternatively, the computer-readable storage medium may be a machine readable signal medium. More specific examples of a machine-readable storage medium may include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

To provide for interaction with a user, the systems and techniques described herein may be implemented on an electronic device having: a display device (e.g., a CRT (cathode ray tube) or LCD (liquid crystal display) monitor) for displaying information to a user; and a keyboard and a pointing device (e.g., a mouse or a trackball) by which a user may provide an input to the electronic device. Other kinds of apparatuses may also be used to provide for interaction with a user; for example, feedback provided to the user may be any form of sensory feedback (e.g., visual feedback, auditory feedback, or tactile feedback); and the input from the user may be received in any form, including acoustic, speech, or tactile input.

The systems and techniques described herein may be implemented in a computing system that includes a back-end component (e.g., as a data server), or that includes a middleware component (e.g., an application server), or that includes a front-end component (e.g., a user computer having a graphical user interface or a web browser through which a user can interact with an implementation of the systems and techniques described herein), or any combination of such back-end, middleware, or front-end components. The components of the system may be interconnected by any form or medium of digital data communication (e.g., a communication network). Examples of communication networks include: local area networks (LANs), wide area networks (WANs), blockchain networks, and the Internet.

The computing system may include clients and servers. Clients and servers are generally remote from each other and typically interact with each other via a communication network. The relationship between clients and servers arises by virtue of computer programs running on the respective computers and having a client-server relationship to each other. The server may be a cloud server, also called a cloud computing server or a cloud host, and is a host product in a cloud computing service system, so that the defects of high management difficulty and weak service scalability in the traditional physical host and VPS service are overcome.

It should be understood that the steps may be reordered, added or deleted by using various forms of the flows shown above. For example, the steps described in the present disclosure may be executed in parallel, sequentially, or in different orders, and are not limited herein as long as the desired result of the technical solution of the present disclosure can be achieved.

The above detailed description should not be construed as limiting the protection scope of the present disclosure. It should be understood by those skilled in the art that various modifications, combinations, sub-combinations and substitutions may be made, depending on design requirements and other factors. Any modification, equivalent and improvement made within the spirit and principle of the present disclosure should be included within the protection scope of the present disclosure.

What is claimed is:

1. A control method for a vehicle, comprising:
   determining, according to image information or map information, lane line information;
   determining, according to the lane line information, a parking trajectory; and
   controlling, according to the parking trajectory, the vehicle,
   wherein the image information comprises a lane line parameter from an image, the map information comprises a lane line parameter from a map, wherein the vehicle comprises an image acquisition apparatus, and the method further comprises:

in response to the map information being available, updating a state of the image acquisition apparatus based on the lane line parameter from the image and the lane line parameter from the map, wherein the updating the state of the image acquisition apparatus based on the lane line parameter from the image and the lane line parameter from the map comprises:

determining a lane line deviation based on the lane line parameter from the image and the lane line parameter from the map;

determining probability parameters according to the lane line deviation; and updating a count value according to a vehicle speed, the probability parameters, and corresponding probability thresholds, wherein the count value is used for representing the state of the image acquisition apparatus; and in response to the updated count value being not greater than a count threshold, determining that the state of the image acquisition apparatus is normal.

2. The method according to claim 1, wherein the determining lane line information according to image information or map information comprises:

in response to the map information being available, determining the lane line information according to the map information; and in response to the map information being not available and the image information being available, determining the lane line information according to the image information.

3. The method according to claim 2, wherein the method further comprises:

in response to the state of the image acquisition apparatus being normal, determining that the image information is available.

4. The method according to claim 1, wherein the probability parameters comprise a first probability parameter, a second probability parameter, and a third probability parameter, wherein the first probability parameter is a probability parameter of a left lane line, the second probability parameter is a probability parameter of a right lane line, and the third probability parameter is a probability parameter of a middle lane line; the image information further comprises a self-diagnostic signal comprising state information of the lane line parameter from the image;

the updating the count value according to the vehicle speed, the probability parameters and a corresponding probability threshold comprises:

in response to the vehicle speed exceeding a speed threshold and the third probability parameter being less than a first probability threshold, increasing the count value by a preset step length; or in response to the vehicle speed exceeding the speed threshold and the third probability parameter being not less than the first probability threshold, updating the count value according to the lane line parameter from the image, the self-diagnostic signal, the first probability parameter and the second probability parameter.

5. The method according to claim 4, wherein the updating the count value according to the lane line parameter from the image, the self-diagnostic signal, the first probability parameter and the second probability parameter comprises:

in response to the lane line parameter from the image and the self-diagnostic signal meeting a first preset condition, decreasing the count value by the preset step length;

in response to the lane line parameter from the image and the self-diagnostic signal meeting the first preset condition and the first probability parameter being not less than a second probability threshold, decreasing the count value by the preset step length; or in response to the lane line parameter from the image and the self-diagnostic signal meeting the first preset condition and the second probability parameter being not less than a third probability threshold, decreasing the count value by the preset step length.

6. The method according to claim 1, wherein the lane line information comprises the lane line parameter from the image and a self-diagnostic signal, the self-diagnostic signal comprising state information of the lane line parameter from the image, and the determining the parking trajectory according to the lane line information comprises:

in response to the lane line parameter from the image and the self-diagnostic signal meeting a first or second preset condition, determining a first or second lane line as the parking trajectory according to the lane line parameter from the image; or in response to the lane line parameter from the image and the self-diagnostic signal meeting a third preset condition, generating a third lane line as the parking trajectory according to a first preset rule.

7. The method according to claim 1, wherein the lane line information comprises the lane line parameter from the map, and the determining the parking trajectory according to the lane line information comprises:

determining, according to the lane line parameter from the map, a lane line as the parking trajectory.

8. The method according to claim 1, wherein the controlling the vehicle according to the parking trajectory comprises:

determining, according to the parking trajectory, a lateral error and a heading error;

compensating the heading error according to vehicle traveling information; and determining, according to the compensated heading error and the lateral error, a control instruction so as to control the vehicle.

9. A vehicle, comprising:

an image acquisition apparatus, configured for acquiring image information;

at least one processor; and a memory in communicative connection with the at least one processor; wherein the memory stores a computer program executable by the at least one processor, and the computer program, when executed by the at least one processor, enables the at least one processor to implement a control method comprising:

determining, according to the image information or map information, lane line information;

determining, according to the lane line information, a parking trajectory; and controlling, according to the parking trajectory, the vehicle, wherein the image information comprises a lane line parameter from an image, the map information comprises a lane line parameter from a map, and the computer program, when executed by the at least one processor, enables the at least one processor to further implement the control method comprising:

in response to the map information being available, updating a state of the image acquisition apparatus based on the lane line parameter from the image and the lane line parameter from the map, wherein the computer program, when executed by the at least one processor, enables the at least one processor to further implement the control method comprising:

determining a lane line deviation based on the lane line parameter from the image and the lane line parameter from the map;

determining probability parameters according to the lane line deviation;

updating a count value according to a vehicle speed, the probability parameters and corresponding probability thresholds, wherein the count value is used for representing the state of the image acquisition apparatus; and in response to the updated count value being not greater than a count threshold, determining that the state of the image acquisition apparatus is normal.

10. The vehicle according to claim 9, wherein the computer program, when executed by the at least one processor, enables the at least one processor to further implement the control method comprising:

in response to the map information being available, determining the lane line information according to the map information; and in response to the map information being not available and the image information being available, determining the lane line information according to the image information;

wherein in response to the state of the image acquisition apparatus being normal, determining that the image information is available.

11. The vehicle according to claim 9, wherein the probability parameters comprise a first probability parameter, a second probability parameter and a third probability parameter, wherein the first probability parameter is a probability parameter of a left lane line, the second probability parameter is a probability parameter of a right lane line, and the third probability parameter is a probability parameter of a middle lane line; the image information further comprises a self-diagnostic signal comprising state information of the lane line parameter from the image;

and the computer program, when executed by the at least one processor, enables the at least one processor to further implement the control method comprising:

in response to the vehicle speed exceeding a speed threshold and the third probability parameter being less than a first probability threshold, increasing the count value by a preset step length; or in response to the vehicle speed exceeding the speed threshold and the third probability parameter being not less than the first probability threshold, updating the count value according to the lane line parameter from the image, the self-diagnostic signal, the first probability parameter and the second probability parameter.

12. The vehicle according to claim 11, wherein the computer program, when executed by the at least one processor, enables the at least one processor to further implement the control method comprising:

in response to the lane line parameter from the image and the self-diagnostic signal meeting a first preset condition, decreasing the count value by the preset step length;

in response to the lane line parameter from the image and the self-diagnostic signal meeting the first preset condition and the first probability parameter being not less than a second probability threshold, decreasing the count value by the preset step length; or in response to the lane line parameter from the image and the self-diagnostic signal meeting the first preset condition and the second probability parameter being not less than a third probability threshold, decreasing the count value by the preset step length.

13. The vehicle according to claim 9, wherein the lane line information comprises the lane line parameter from the image and a self-diagnostic signal, the self-diagnostic signal comprising state information of the lane line parameter from the image, and wherein the computer program, when executed by the at least one processor, enables the at least one processor to further implement the control method comprising:

in response to the lane line parameter from the image and the self-diagnostic signal meeting a first or second preset condition, determining a first or second lane line as the parking trajectory according to the lane line parameter from the image; or in response to the lane line parameter from the image and the self-diagnostic signal meeting a third preset condition, generating a third lane line as the parking trajectory according to a first preset rule.

14. A non-transitory computer-readable storage medium having a computer instruction stored thereon, wherein the computer instruction, when executed by a processor, causes the processor to implement a control method comprising:

determining, according to image information or map information, lane line information;

determining, according to the lane line information, a parking trajectory; and controlling, according to the parking trajectory, a vehicle, wherein the image information comprises a lane line parameter from an image, the map information comprises a lane line parameter from a map, the vehicle comprises an image acquisition apparatus, and the computer instruction, when executed by the processor, causes the processor to further implement the control method comprising:

in response to the map information being available, updating a state of the image acquisition apparatus based on the lane line parameter from the image and the lane line parameter from the map, wherein the computer instruction, when executed by the processor, causes the processor to further implement the control method comprising:

determining a lane line deviation based on the lane line parameter from the image and the lane line parameter from the map;

determining probability parameters according to the lane line deviation;

updating a count value according to a vehicle speed, the probability parameters and corresponding probability thresholds, wherein the count value is used for representing the state of an image acquisition apparatus; and in response to the updated count value being not greater than a count threshold, determining that the state of the image acquisition apparatus is normal.

15. The non-transitory computer-readable storage medium according to claim 14, wherein the computer instruction, when executed by the processor, causes the processor to further implement the control method comprising:

in response to the map information being available, determining the lane line information according to the map information; and in response to the map information being not available and the image information being available, determining the lane line information according to the image information;

wherein in response to the state of the image acquisition apparatus being normal, determining that the image information is available.

16. The non-transitory computer-readable storage medium according to claim 14, wherein the probability parameters comprise a first probability parameter, a second probability parameter and a third probability parameter, wherein the first probability parameter is a probability parameter of a left lane line, the second probability parameter is a probability parameter of a right lane line, and the third probability parameter is a probability parameter of a middle lane line; the image information further comprises a self-diagnostic signal comprising state information of the lane line parameter from the image;

and the computer instruction, when executed by the processor, causes the processor to further implement the control method comprising:

in response to the vehicle speed exceeding a speed threshold and the third probability parameter being less than a first probability threshold, increasing the count value by a preset step length; or in response to the vehicle speed exceeding the speed threshold and the third probability parameter being not less than the first probability threshold, updating the count value according to the lane line parameter from the image, the self-diagnostic signal, the first probability parameter and the second probability parameter.

17. The non-transitory computer-readable storage medium according to claim 16, wherein the computer instruction, when executed by the processor, causes the processor to further implement the control method comprising:

in response to the lane line parameter from the image and the self-diagnostic signal meeting a first preset condition, decreasing the count value by the preset step length;

in response to the lane line parameter from the image and the self-diagnostic signal meeting the first preset condition and the first probability parameter being not less than a second probability threshold, decreasing the count value by the preset step length; or in response to the lane line parameter from the image and the self-diagnostic signal meeting the first preset condition and the second probability parameter being not less than a third probability threshold, decreasing the count value by the preset step length.

* * * * *